Patented June 21, 1932

1,863,700

UNITED STATES PATENT OFFICE

WILLIAM SEGUINE, JR., AND ALBERT THOMAS MERTES, OF NEWPORT, DELAWARE, ASSIGNORS, BY MESNE ASSIGNMENTS, TO THE GRASSELLI CHEMICAL COMPANY, OF CLEVELAND, OHIO, A CORPORATION OF DELAWARE

MANUFACTURE OF HYDRATED ZINC OXIDE

No Drawing. Application filed December 9, 1929. Serial No. 412,912.

This invention relates to the manufacture of zinc oxide, and more particularly to a process for the production of an improved form of zinc oxide possessing new and characteristic properties.

It has long been known that zinc oxide is a valuable pigment for paint purposes and also finds extensive application in the rubber industry as a reinforcing material. Zinc oxide heretofore has generally been produced by the direct oxidation of zinc metal vapor.

It is known that zinc chloride solutions can be precipitated by milk of lime to form zinc hydrate and calcium chloride approximately in accordance with the equation:

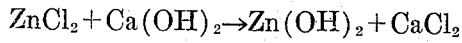

$$ZnCl_2 + Ca(OH)_2 \rightarrow Zn(OH)_2 + CaCl_2$$

However, it has been considered a matter of extreme difficulty, if not an impossibility, to remove lime and chlorides from the precipitated zinc hydrate by washing due to the formation of insoluble oxychlorides.

The above methods have been found to be unsatisfactory for a number of reasons, among which may be mentioned the following:

(1) When milk of lime is added to a zinc chloride solution the reaction does not proceed exactly in accordance with the theoretical equation

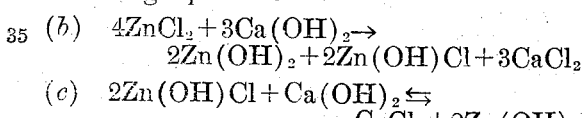

(a) $ZnCl_2 + Ca(OH)_2 \rightarrow Zn(OH)_2 + CaCl_2$ but probably takes place according to the following equations:

(b) $4ZnCl_2 + 3Ca(OH)_2 \rightarrow$
  $2Zn(OH)_2 + 2Zn(OH)Cl + 3CaCl_2$ (c) $2Zn(OH)Cl + Ca(OH)_2 \rightleftarrows$
  $CaCl_2 + 2Zn(OH)_2$ In other words, the zinc is converted to zinc hydrate and zinc oxychloride (Zn(OH)Cl) according to Equation (b). Subsequently, the zinc oxychloride is converted to zinc hydrate by the action of more calcium hydroxide according to Equation (c). The end point of the lime reaction is not sharp, however, and to remove the chlorides to such a point that the final washed zinc precipitate shall have less than, for example, .3% of chlorides calculated as chlorine requires such an excess of lime that the final product will contain in the vicinity of 3-5% calcium compounds calculated as calcium oxide. On the other hand, if insufficient lime be used with a view to reducing the amount of calcium in the final product, the chloride content rises to approximately 1% or over. A product resulting from a process in which insufficient lime is used is not strictly suitable for pigment purposes because it will invariably contain chlorine, probably in the form of a basic zinc chloride. On the other hand, a product resulting from a process in which an excess of lime is used will contain calcium compounds and these render the product less valuable as rubber reinforcing material.

(2) The zinc solutions usually employed are obtained from leaching operations of various kinds and are generally quite dilute, especially solutions of zinc chloride containing zinc sulphate. When solutions containing zinc sulphate are used, this substance must be converted to zinc chloride by the precipitation of the sulphate as gypsum or blanc fixe by the use of calcium chloride or barium chloride solutions, respectively. Such treatment greatly increases the dilution and when these solutions are precipitated with milk of lime a large quantity of steam is required to heat the great volume of solution to the required temperature and this renders the conversion of the zinc to zinc hydrate or hydrated oxide extremely expensive.

(3) The zinc solutions obtained from leaching operations usually contain impurities such as iron, manganese, cobalt, nickel, lead, copper, cadmium, and the like, which, unless they are removed by special treatment, find their way into the finished product and render it unsuitable for pigment or rubber purposes.

So far as applicants are aware, the prior art has not disclosed a wet process for obtaining a hydrated zinc oxide of low particle size which is substantially free from calcium compounds and chlorides.

This invention has as an object to provide a new process for the manufacture of zinc oxide suitable for pigment and rubber purposes. Another object is to provide a process which makes possible an accurate control of the lime and chloride content of the finished product within narrow limits. A further object is to provide a method for converting all of the zinc of a zinciferous solution to zinc oxide or hydrated zinc oxide without thereby introducing an undersirable excess of lime into the product. A still further object is to provide a method for removal of excess lime from a zinc oxide pulp without introducing an undesirable excess of chlorides or other detrimental salts into the product. It is also an object to provide a new and improved form of precipitated zinc oxide. It is a further object to provide a zinc oxide of extremely fine particle size and free from undesirable constituents. It is a further object to produce a material which may be heated to give a pigment of superior opacity. It is another object to provide an improved form of zinc oxide possessing high activating and reinforcing power when used in rubber manufacture. Other objects will appear hereinafter as the following description proceeds.

These objects are accomplished by the following invention which in its broadest aspects comprises such a control of the conditions of precipitation of the zinc in the form of zinc oxide or hydrated zinc oxide that the final product, after appropriate filtering, washing, drying, heating, etc., will have an extremely low particle size, and will be substantially free from an undesirable excess of calcium compounds and chlorides, and also substantially free from contaminating metals such as zinc, lead, cadmium, copper, etc.

The salient features of this control of precipitating conditions may be briefly stated as (1) addition of a slight excess of lime over that theoretically required to convert all of the zinc to zinc oxide or hydrated oxide and (2) subsequent removal of the lime excess by the addition of an acid without driving the reaction in a direction to convert the zinc oxide back to zinc oxychloride, and thereby makes possible the removal of substantially all the calcium as calcium chloride by ordinary washing methods.

Expressed in theoretical terms, applicants' invention consists, among other things, in the discovery that the reaction between calcium hydroxide and zinc oxychloride is a mass reaction and that by adding a slight excess of lime the reaction may be completed in the direction of formation of the desired product, namely, zinc hydrate, and in the further discovery that, contrary to what would ordinarily be expected from a consideration of this type of reaction, the addition of an acid effects the removal of the slight excess of lime without driving the zinc oxide back into the form of zinc oxychloride.

In the following procedure we have set forth one of the preferred examples of the practice of our invention, but it is to be understood that this procedure is merely illustrative and is not to be regarded as a limitation.

We have found that the character of the zinc solution from which the zinc oxide is to be precipitated is of importance. The principal requisites of a solution adapted to the production of the desired product are (1) it must contain a soluble zinc salt, preferably zinc chloride; (2) it must be substantially free from such impurities as iron, manganese, cobalt, nickel, lead, copper, cadmium, aluminum, and should preferably contain no free acid or sulphates. An economical source of zinc containing solutions is the liquors obtained from certain pyrites cinder leaching operations, but since these solutions generally contain the impurities just alluded to, it is necessary that they be purified in order to remove the contaminating substances. This purification may be carried out in a variety of ways, but we prefer to use the method outlined in the copending application of William Seguine, Jr., Serial No. 394,379, entitled Method of purification of zinc solutions, filed September 21, 1929. The preferred concentration of zinc in the purified solution is about 40–75 grams per liter. The lime used in making up the milk of lime suspension is preferably a highly reactive calcium oxide, for example, a product such as usually produced in the rotary type of lime kiln. The preferred concentration of calcium oxide is about 150 grams per liter calculated as the oxide, since this gives the correct working consistencies and yet makes economical handling possible.

Example: Milk of lime slurry containing the desired concentration of $Ca(OH)_2$ is added to the purified zinc solution with agitation. Although the lime solution may be added to the zinc solution, we prefer to add both solutions simultaneously.

In practice we have found that about 78% of the theoretical amount of calcium hydroxide required to satisfy Equation ($a$) above will precipitate all the zinc, probably as zinc hydrate and zinc oxychloride, but nevertheless a sufficient amount of calcium hydroxide is added, not only to provide for the conversion of all of the zinc oxychloride to zinc hydrate, but also to provide a slight excess of about 2–4% of the theoretical amount required for the reaction, thus giving a preponderance of (OH) ions in the solution.

The slurry is then filtered to remove the great bulk of the water which contains the major portion of the chlorides formed in the reaction. The residue is then repulped in a small quantity of clean water. The pulp is heated and a sample rapidly withdrawn and analyzed for insoluble chlorides until substantially all the chlorine is in solution. At this point the pulp is then analyzed for insoluble lime. A calculated amount of hydrochloric, nitric, or other acid giving a water soluble lime salt is added to the pulp. After a period of agitation to insure thorough mixing and solution of the insoluble lime, the pulp is filtered and washed free from chlorides. The material thus obtained is treated in a hydroseparator to remove sand and any unburned calcium oxide which may have found its way into the process by way of the lime slurry. The pure hydrated zinc oxide slime is then conveyed to a Dorr thickener, the underflow of which is filtered, dried and disintegrated according to conventional practice in the treatment of other pigments.

The material is now in a form suitable for use as a reinforcing material in the rubber industry. It contains less than 2% of calcium compounds, calculated as calcium oxide, and less than .3% of chlorides calculated as chlorine. The product is free from aluminum, iron, manganese, cobalt, nickel, lead, copper, cadmium, and the like, and will contain practically no sulphur in the form of sulphur dioxide or sulphites. It contains about 1–8% water of hydration. On account of the ratio of hydration, the specific gravity of our product will range from about 4.5 to about 5.6. In addition, it will be free from zinc in the form of finely divided metal which sometimes occurs in zinc oxides prepared by oxidation of zinc vapor. A water slurry of the material will be slightly alkaline, giving a hydroxyl ion concentration in excess of 7pH.

One of the distinguishing features of our improved product is its extremely fine particle size. This ranges from about .15 to about .3 microns for uncalcined zinc oxide. There are a number of satisfactory methods of determining particle size, but of these we prefer to use the ultra centrifuge method, the details of which are given below.

In its general aspects the method comprises the use of a transparent cell containing the solution to be studied which is rotated at a speed sufficient to produce a strong centrifugal field of force and thus increase tremendously the effect of gravity on the solution. A beam of light passes up through the cell and renders the contents of the cell visible during the rotation, so that the variation in concentration along the length of the cell can be determined visually, or photographically in terms of photographic densities.

If the soultion consists of equal-sized particles and the centrifuging is rapid enough the diffusion may be neglected; the particle or micella size may then be determined by measuring the displacement of the boundary $x_2-X_1$ in the time interval $t_2-t_1$, using a modified form of Stokes' law. With non-uniform material, however, a partial separation is effected giving us an opportunity to determine the distribution of sizes present, from analysis of the concentration-distance curve obtained.

The type of cells and the mechanical features of the ultracentrifuge used in the pigment work are described in good detail in an article by Svedberg and Heyroth, J. A. C. S., 51, 552, (1929). It is sufficient to mention that the rotor containing the cells for the pigment dispersion is supported on the ball bearing spindle of an improved Baltic cream separator. A continuous stream of hydrogen passes through the rotor chamber to reduce the production of heat by the rotor in motion and the chamber containing the rotor is thermostated in a waterbath at 30° C.

Parallel light is used for all determinations so the optical system is the same as that described in an article by Svedberg and Nichols, J. A. C. S., 49, 2926 (1927). Parallel light is produced by focussing the image of the incandescent ball of a fixed focus 100 C. P. Pointolite lamp on a diaphragm by means of a Dalimeyer lens of aperture f: 1.9 and focal length 7.5 cm. The light from the diaphragm is then made parallel by means of a Goerz lens of aperture f: 3.5 and focal length 15 cm. The parallel beam of light is then passed through a water filter to remove the heat and is then reflected up through the centrifuge cell by a quartz reflecting prism and thence to a Zeiss reproduction lens of aperture f: 9 and focal length 32 cm., which throws an image of the cell on an Eastman process or universal photographic plate.

*Method of making a determination.*—An 0.025 g. sample of the pigment is rubbed up carefully in a smooth mortar with a drop of two of 95% glycerin and then glycerin is added a little at a time, with thorough pestling each time until 100 g. of 95% glycerin has been added. Enough of the dispersion is then pipetted into the centrifuge cell to give a column length of about 15 mm. when the centrifuge is in motion. The cell is then clamped in place in the rotor, the lid of the rotor chamber fastened in place and the hydrogen started flowing through the rotor chamber. The waterbath is filled, the temperature regulated at 30° C. and the rotor allowed to remain still for about half an hour to reach the same temperature as that of the waterbath before starting the machine.

While the centrifuge is being brought up to the desired speed (2400 to 4800 R. P. M.) the first photograph is taken with an exposure time of 10 to 20 seconds, burning the Pointolite at 1.2 A and adjusting the variable diaphragm in the light path to give the desired blackening on the photographic plate. The use of the Pointolite lamp without filter and with process plates means that blue light of 435 mm. wave length is employed for the photographic recording of the effect of centrifuging.

A series of photographs are then taken at suitable times, such as 10, 20, 30 . . . minutes after the start of the centrifuging. At the end of the run pictures are taken of a series of fractional concentrations of the dispersion, for example, glycerin, 20%, 40%, 60%, 80% and 100% of the original stock solution under the same conditions as in the centrifuging but immediately after starting the machine so that no sedimentation has taken place.

The plate is then developed and both the series of pictures taken during the sedimentation of the material subjected to the centrifugal force and the pictures of the known concentrations are photometered in a Siegbahn automatic microphotometer (Backlin, Z. Instrumentenkunde, 47, 373 (1927). From the photometer curves obtained it is possible to draw the curves showing the change of concentration in the centrifuge cell with distance out from the meniscus of the dispersion. From the concentration-distance curves the distribution curve of particle size is calculated by means of the modified Stokes' equation for the centrifuge (Svedberg and Rinde, J. A. C. S. 46, 2683, (1924); Nichols and Liebe, Third Colloid Symposium 1925, p. 273).

The dry product in the form described above is not suitable for use as a paint pigment on account of its low obscuring power, but to give it the characteristics desired for this purpose it is only necessary to heat the material in a closed cylinder with superheated steam to a temperature of about 300° C. at atmospheric pressure for a period of about one-half hour. This heat treatment markedly increases the particle size, thereby giving it the opacity necessary for paint purposes.

We do not wish to be limited to the exact details of operation above disclosed, since our process may be modified in many of its details without departing from the spirit or scope of our invention. For example, although we prefer to use a zinciferous solution as described above, we may use other zinc containing solutions provided they do not contain the substances indicated as detrimental to the finished material. We may use a solution of chemically pure zinc chloride or solutions of other zinc salts provided they do not introduce undesired radicals, such as sulphate, which react with the calcium hydroxide to form gypsum and other diluting substances.

Although we prefer to add both the zinc and lime solutions simultaneously, we may add the lime slurry all at once to a given amount of zinc solution. The preferred concentration of zinc is 60 grams per liter, but a concentration as low as 25 grams per liter may be used. In like manner, while we prefer to use a concentration of 150 grams per liter of calcium hydroxide, we may use a concentration as low as 50 grams, or as high as 300 grams, per liter.

In practice we add 78% of the theoretical amount of calcium hydroxide at once, and thereafter add the remaining 22%, together with a 2–4% excess to provide the necessary basicity, but if desired, we may add the total amount of lime at once.

In the process described above we do not wish to be understood as limiting ourselves to the use of hydrochloric acid, since any acid which is capable of reacting with the slight excess of calcium hydroxide to form a soluble salt which may be subsequently removed from the precipitate by washing may be employed.

We have already alluded to several of the distinctive properties of our new zinc oxide product and its process of manufacture, but we wish to again emphasize certain advantages over the prior art. Among these may be mentioned the fact that while our product possesses all of the desirable properties of zinc oxides produced by known fuming processes, due to its preparation by precipitation from solution, it is entirely free from particles of metallic zinc which sometimes find their way into a fumed product by the sudden cooling of minute portions of the zinc vapors before they have had an opportunity to become oxidized. Our process also makes possible the production of a product entirely free from acidity, and from heavy metals such as lead and cadmium.

An especial advantage of our process from the standpoint of economy of operation is the fact that it makes possible the use of zinc solutions obtained as a by-product from certain metallurgical operations such as the leaching of low grade zinc ores which have undergone chloridizing roasting. In fact, our product can be made from zinc ores which are not otherwise amenable to treatment and utilization.

As many apparent and widely different embodiments of this invention may be made without departing from the spirit and scope thereof, it is to be understood that we do not limit ourselves to the specific embodiments thereof except as defined in the appended claims.

We claim:

1. The process of producing a hydrated zinc oxide which comprises adding to a substantially pure zinc chloride solution an amount of milk of lime slightly in excess of that equivalent to the zinc chloride, heating the resulting pulp until all chlorine compounds are water soluble, adding an acid, the calcium salts of which are water soluble, in sufficient amount to convert the excess of calcium hydroxide to a soluble calcium salt, separating the hydrated zinc oxide formed from the reaction liquor, and thereafter washing and drying the precipitate.

2. The process of claim 1 in which the excess of calcium hydroxide amounts to from 2-4%.

3. The process of producing a hydrated zinc oxide which comprises adding to a substantially pure zinc chloride solution milk of lime containing from 2-4% calcium hydroxide in excess of that equivalent to the zinc chloride, heating the resulting pulp to a temperature of from 70-100° C. until all chlorine compounds are water soluble, adding hydrochloric acid in sufficient amount to convert the remaining calcium hydroxide to calcium chloride, separating the hydrated zinc oxide formed from the reaction liquor and thereafter washing and drying the hydrated zinc oxide formed.

In testimony whereof we affix our signatures.

WILLIAM SEGUINE, JR.
ALBERT THOMAS MERTES.